(12) United States Patent
Knauseder

(10) Patent No.: US 7,897,005 B2
(45) Date of Patent: Mar. 1, 2011

(54) FLOORING PANELS

(75) Inventor: Franz Knauseder, Salzburg (AT)

(73) Assignee: M. Kaindl, Salzburg (AT)

( * ) Notice: Subject to any disclaimer, the term of this patent is extended or adjusted under 35 U.S.C. 154(b) by 848 days.

(21) Appl. No.: 11/229,718

(22) Filed: Sep. 20, 2005

(65) Prior Publication Data

US 2006/0010818 A1    Jan. 19, 2006

Related U.S. Application Data

(63) Continuation of application No. 09/814,066, filed on Jun. 21, 2001.

(30) Foreign Application Priority Data

Jun. 6, 2000    (AT)    ................ A 992/2000

(51) Int. Cl.
B29C 65/52    (2006.01)
B29C 65/58    (2006.01)
E04F 15/04    (2006.01)
(52) U.S. Cl. .................... 156/304.5; 156/71
(58) Field of Classification Search ........... 156/304.5, 156/71, 304.1; 52/588.1, 592.1, 592.4; 403/267, 403/268, 381
See application file for complete search history.

(56) References Cited

U.S. PATENT DOCUMENTS

| | | | |
|---|---|---|---|
| 2,141,313 A | | 12/1938 | Osgood et al. |
| 3,257,225 A | * | 6/1966 | Marotta et al. ............. 427/202 |
| 3,518,159 A | * | 6/1970 | Allan et al. ................ 428/525 |
| 3,802,986 A | * | 4/1974 | Forsythe .................... 156/258 |
| 3,988,187 A | * | 10/1976 | Witt et al. .................... 156/71 |
| 4,047,347 A | | 9/1977 | Scheild |
| 4,081,308 A | * | 3/1978 | Skoultchi ................... 156/310 |
| 4,095,388 A | * | 6/1978 | Breault .................... 52/747.11 |
| 4,195,462 A | | 4/1980 | Keller et al. |
| 4,242,390 A | | 12/1980 | Nemeth |
| 4,416,097 A | | 11/1983 | Weir |
| 5,323,584 A | | 6/1994 | Scarlett |
| 5,389,699 A | * | 2/1995 | Rehmer et al. ................ 522/35 |

(Continued)

FOREIGN PATENT DOCUMENTS

AT    405560    9/1999

(Continued)

OTHER PUBLICATIONS

English Language Abstract of JP 6-8587, 1994.

(Continued)

Primary Examiner—Mark A Osele
(74) Attorney, Agent, or Firm—Andrew M. Calderon; Roberts Mlotkowski Safran & Cole, P.C.

(57) ABSTRACT

A method of connecting structural components having a relatively low thickness, the method including pre-applying, at an off-site location, one of an adhesive and a substance which activates an adhesive to at least one of at least one of the sides of the groove of one of the structural components and at least one of the sides of the tongue of another of the structural components, and connecting, at a site different from the off-site location, the structural components together by causing the tongue to be inserted into the groove.

45 Claims, 4 Drawing Sheets

U.S. PATENT DOCUMENTS

| | | | |
|---|---|---|---|
| 5,618,602 A | 4/1997 | Nelson | |
| 5,626,705 A * | 5/1997 | Winterowd et al. | 156/304.5 |
| 5,639,027 A | 6/1997 | Fritz | |
| 5,865,936 A * | 2/1999 | Edelman et al. | 156/310 |
| 5,899,251 A | 5/1999 | Turner | |
| 5,944,938 A | 8/1999 | Winterowd et al. | |
| 6,004,417 A | 12/1999 | Roesch et al. | |
| 6,101,778 A * | 8/2000 | Martensson | 52/582.1 |
| 6,397,548 B1 | 6/2002 | Martin et al. | |
| 6,418,990 B1 * | 7/2002 | Lindstrom | 144/348 |
| 6,438,919 B1 | 8/2002 | Knauseder | |
| 6,682,254 B1 * | 1/2004 | Olofsson et al. | 403/375 |
| 6,766,622 B1 * | 7/2004 | Thiers | 52/591.3 |
| 6,808,777 B2 * | 10/2004 | Andersson et al. | 428/47 |
| 6,922,965 B2 * | 8/2005 | Rosenthal et al. | 52/592.1 |
| 2003/0141004 A1 * | 7/2003 | Palmblad et al. | 156/64 |

FOREIGN PATENT DOCUMENTS

| | | |
|---|---|---|
| CA | 2283288 | 8/2003 |
| CH | 497524 | 11/1970 |
| DE | 3117605 | 11/1982 |
| DE | 3834026 | 4/1990 |
| DE | 19547864 | 6/1997 |
| DE | 29703962 | 6/1997 |
| EP | 0200296 | 12/1986 |
| EP | 0855482 | 7/1998 |
| EP | 0970755 | 1/2000 |
| EP | 1229182 | 8/2002 |
| FR | 1147651 | 11/1957 |
| GB | 213337 | 12/1922 |
| GB | 1427337 | 3/1976 |
| JP | 57-119056 | 7/1982 |
| JP | 6-8587 | 1/1994 |
| SU | 1434144 | 10/1988 |
| WO | 94/04773 | 3/1994 |
| WO | 94/26999 | 11/1994 |
| WO | 97/47834 | 12/1997 |
| WO | 98/58142 | 12/1998 |
| WO | 99/66151 | 12/1999 |
| WO | 01/94720 | 12/2001 |
| WO | 01/94721 | 12/2001 |

OTHER PUBLICATIONS

English language translation of JP 57-119056, 1982.
English Language Abstract of EP 1 229 182, 2002.
Engliah Language Translation of DE 38 34 026, 1990.
English Language Translation of DE 195 47 864, 1997.
English Language Translation of CH 497524, 1970.

* cited by examiner

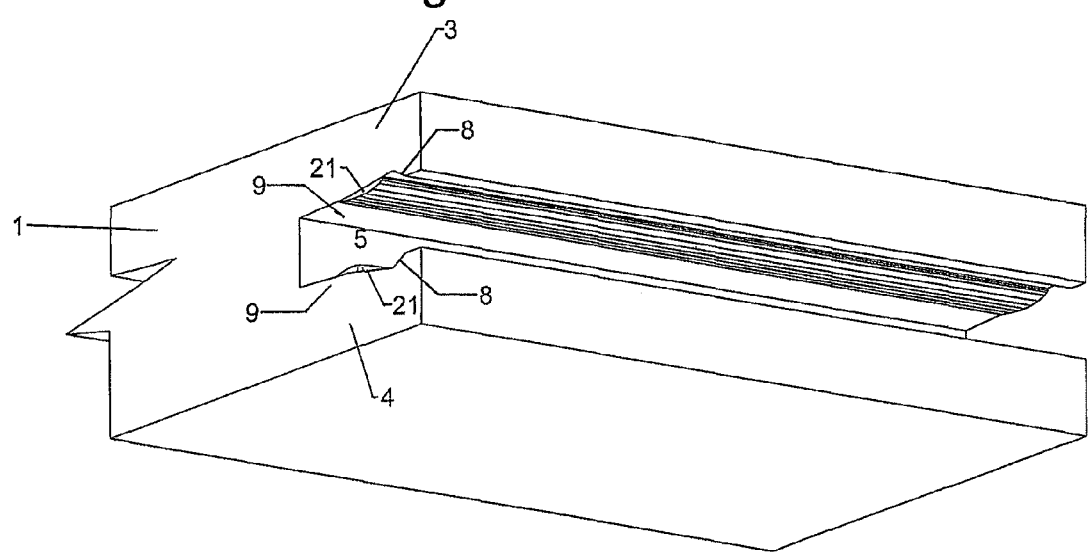

FLOORING PANELS

CROSS-REFERENCE TO RELATED APPLICATIONS

The present application is a continuation of U.S. application Ser. No. 09/814,066 filed Jun. 21, 2001, the disclosure of which is expressly incorporated by reference herein in its entirety. The instant application is also based upon Austrian Priority Patent Application No. A 992/2000 filed Jun. 6, 2000, the priority of which is hereby claimed under 35 U.S.C. §119.

BACKGROUND OF THE INVENTION

1. Field of the Invention

The invention deals with a configuration for connecting flat components of relatively slight thickness along their narrow circumferential sides, components that can be manufactured simply and durably, while the adhesive employed to glue the elements according to the invention is preapplied at the factory, so that there is no laborious application of glues to the connecting elements on site. This also assures that the intended quantity of glue is always precisely maintained.

2. Discussion of Background Information

For conventional tongue and groove connections of panels, floor-boards, cover facings, and the like, DE-29703962 U1 already discloses the factory application of glue to areas that adjoin and run perpendicular to the surface and are provided in order to be positioned against the next paneling element, such that the individual elements can be glued together along the areas adjoining the surface by means of tongue and groove connecting elements, thereby providing a sealed surface. The disadvantage of this kind of design is that—due to the employed glue, specifically a contact glue—the two surfaces that come into contact must be pressed together with a considerable degree of pressure, making it impossible to additionally adjust the glued joint in the longitudinal direction for the purpose of closing a transverse joint.

Also known from AT-patent 405560 are connections in which two plate-shaped or strip-shaped components resting against each other will interlock according to the tongue and groove principle; here the groove sides, or one of the two sides, diverges away from the groove base and converges at the end away from the groove, at an angle that is larger than the angle of divergence, while the opening width of the groove is greater than the front area (viewed along the line of insertion) of the tongue, which, proceeding from this front area, exhibits wedge-shaped areas that diverge at the same angle as the groove sides, or one of the wedge-shaped areas fitted to the groove shape, which wedge-shaped area, in conformity with the groove cross-section, exhibits an undercut in the back area of the tongue, with border areas that are adjacent to the wedge-shaped areas and that converge at the same angle as the groove side, to form a connecting bridge to the component. After the groove has been inserted in the groove, the projection furnished with the converging groove sides snaps into the undercut of the tongue, while the converging groove side area slides along the wedge-shaped areas leading to the connecting bridge and thereby draws the tongue into the groove.

SUMMARY OF THE INVENTION

The invention is based on the preliminary application of glue to those groove or tongue areas belonging to interlocking tongue and groove connections, which areas are pressed together when the tongue is automatically drawn into the groove and are fixed in this position by the interlocking connection. This renders superfluous any additional fixing means for holding the components together during the setting phase; this gives automatically a secured connection.

The invention provides for a configuration for combining flat structural components of relatively low thickness along their narrow circumferential sides, where connecting members that interact on the tongue-and-groove principle are provided at the areas being connected, and the sides of the groove diverge from the groove base and converge at the end away from the groove base at an angle that is greater than the angle of divergence, where the opening width of the groove is greater than the foremost area of the tongue in the direction of insertion, which tongue exhibits wedge-shaped areas that diverge from front to back at the same angle as the sides of the groove, each of which wedge-shaped areas exhibits an undercut in the back area of the tongue that conforms to the groove cross-section, while the undercut's borders, adjoining the wedge-shaped areas, converge at the same angle as the groove sides toward a connecting bridge that is part of the component, wherein an adhesive layer, or a substance which activates an adhesive, is applied to the groove at least in the area of its divergent sides or to the tongue at least in the area of its divergent wedge-shaped area, or to both areas.

On at least one side of the groove and at least one side of the tongue, locking elements that conform to each other and ideally extend over the entire length of the groove and the tongue are provided in the form of an indentation or recess, or in the form of a projection, in order to hold connected components in joined position; and where the groove is formed directly in the component itself, or is worked out of the same, in order to provide for the solid connection of the components; the particularly heavy tongue forms a single piece with the component or is worked out of the same; the width of the groove increases from inside outward; the thickness of the tongue decreases in the direction of its unattached end; the projection on the tongue exhibits a shorter back area that with the surface of the components encloses an angle that exceeds the angle; the recess in the groove exhibits a shorter contact surface that lies at a distance from the groove base and that rests against the shorter, back surface of the projection; at least one, and ideally both, of the two groove sides can flex elastically and outwards relative to the other groove side, so that in locked position the tongue is held by the groove sides with a squeezing action or can be inserted into the groove while the groove sides bend elastically; and the angle between the two triangle sides or between longer front tongue area and the shorter back tongue area is 100° to 140°, particularly 110° to 130°; where the two legs of the groove are equally long; where the recess in the groove exhibits a contact area close to the groove base that in locking position at least partially rests against the longer front surface; where the triangle side close to the groove base, or the section of the tongue area received by the recess, is four to eight times, ideally five to seven times, as long as the triangle side distant from the groove base or the shorter back area; and where the tongue is provided with a layer of adhesive or with an adhesive with an activating substance on at least the contact surface of the groove walls close to the groove base and/or on the longer front area of the tongue.

The grooves of the individual panels, specifically at least one of the lateral groove areas, are provided with a filling, coating, covering, strand, or the like, consisting of a latent adhesive material that becomes active after appropriate activation, and the tongues, specifically at least one of their side areas, is provided with a coating or surface impregnation, a covering, strand, or the like that, if so desired, is applied to the panels and ideally moistens them shortly before they are joined together and consists of an activator which induces adhesion.

The grooves of the panels, specifically at least one of their lateral areas, is provided with a filling, specifically a coating, consisting of an adhesive or glue that is stabilized by the removal of a solvent or a dispersion agent, ideally water, but that can be reactivated upon contact with a solvent, particularly water or water moisture, and the tongues of the panels, specifically at least one of their lateral areas, are provided with a film or covering that is applied or sprayed on shortly before the panels are joined together and that covers, or at least moistens, said tongues, or with a comparable surface impregnation, consisting of a solvent or dispersing agent, particularly water, which serves as an activator for the adhesive or glue.

The grooves of the panels, specifically at least one their lateral areas, are provided with a filling, specifically a coating, consisting of a dispersion glue that is stabilized by the removal of water, but that can be reactivated upon contact with a solvent, particularly water or water moisture, and particularly consisting of a fast-binding and mounting glue on a polyvinyl acetate base, for example, Dorus MDO 55 (manufacturer: Henkel) or of another commercially available wood glue, e.g., on a starch and/or protein base.

The grooves of the panels, specifically at least one of their lateral areas, are coated with an initial component, specifically with the unhardened or not fully hardened resin component of a two-component polymerization glue, and the tongues, specifically at least one of their lateral areas, are coated with the second component, specifically the hardener component, of said two-component glue, or vice versa.

The grooves or the tongues of the panels, in particular at least one of their lateral areas, are coated with the second component, specifically the hardener component, applied in the course of manufacturing the panels, of a two-component polymerization glue, ideally in the form of a hardener varnish, and with a first component, specifically the resin component, which is applied to the hardener component, specifically the hardener varnish, preferably shortly or immediately before the panels are laid.

The hardener component of the two-component glue, specifically the hardener varnish, has an organic peroxide as its base and resin component to be hardened with said varnish has a methyl acrylate base.

The hardener component of the two-component glue, specifically the hardener varnish, has an aliphatic or cycloaliphatic polyamine as its base and its resin component is based on an epoxide and/or bisphenol A and/or bisphenol F resin.

At least one of the lateral areas of the groove belonging to the panels and/or at least one of their tongue lateral areas is, or are, provided with a coating or strand with a micro-encapsulated adhesive that is immediately active.

The micro-encapsulated adhesive takes the form of a two-component adhesive with a mixture of a micro-encapsulated resin component, for example, with a methylacrylate base, and a micro-encapsulatd hardener component, for example, with a peroxide base.

At least one of the lateral groove areas of the panels is provided with a coating or with a strand of the micro-encapsulated resin component of a two-component adhesive and at least one of the lateral tongue areas that interacts with said coated lateral groove area is provided with a coating, or film or strand, of the also micro-encapsulated hardener component of said two-component adhesive, or vice versa.

At least one of the lateral groove areas and/or at least one of the lateral tongue areas is provided with a coating or a film of micro-capsules that are dispersed in a matrix of the hardener component of a two-component adhesive and that contain the resin component of the same adhesive, or of micro-capsules dispersed in a matrix of the resin component and containing the hardener component.

The grooves of the panels, specifically at least one of their lateral areas, and/or the tongues, specifically at least one of their lateral areas, are covered or coated with a lastingly sticky and permanently active adhesive glue, particularly a molten adhesive glue.

The grooves of the panels, specifically at least one of their lateral areas, and/or the tongues, specifically at least one of their lateral areas, are coated with a lastingly sticky and permanently active adhesive glue, particularly a molten adhesive glue, that exhibits viscosity values between 15,000 and 1500 centi-poise at temperatures between 140° and 170° C. and is applied at temperatures in the indicated range, preferably in the range between 145° and 155° C.

The grooves of the panels, specifically at least one of their lateral areas, and/or the tongues, specifically at least one of their lateral areas, are coated with a lastingly sticky and permanently active adhesive glue, particularly a molten adhesive glue, with the commercial designation Dorus PS 534/5 and/or Dorus PS 576/6 (Henkel Company).

The grooves of the panels, specifically at least one of their border areas, and/or the tongues, specifically at least one of their borders areas, are provided with an integral adhesive strand exhibiting a core strand of a lastingly sticky and permanently active adhesive glue and a polymer cladding strand that surrounds said core strand on all sides, prevents the diffusion of water or any adhesive solution or dispersion agent, and can be destroyed by the action of pressure and shearing forces exerted when the panels are brought together, where the core strand is formed with an active adhesive or glue with setting properties that is prepared with water and/or a dispersion agent or solvent, particularly wood glue, on a synthetic polymer base, ideally on a polyvinyl acetate base, and/or on a biopolymer base, ideally on a starch and/or protein base.

The cladding strand for the adhesive or cement strand is formed with a flexible polymer material that is adhesive relative to the material of the panel, at least upon application of the integral adhesive strand, and that ideally will set rapidly, and preferably with a synthetic rubber, specifically with butyl rubber, or with a two-component or moisture-linking polyurethane rubber mass.

The grooves, specifically at least one of their lateral areas, and/or the tongues, specifically at least one of their lateral areas, are provided with an integral adhesive strand that exhibits a cross-section with the shape of a flattened dome.

The coating of the grooves of the panels, specifically of at least one of their lateral areas, with an adhesive that is stabilized by the removal of water but can be (re)activated upon contact with water or water moisture exhibits a basically uniform layer thickness in the range from 0.1 to 0.4, specifically 0.15 to 0.25 mm, with thickness tolerances in the range of 0.05 mm.

The invention also provides for a method of connecting first and second structural components having a relatively low thickness, the first structural component comprising a tongue, the second structural component comprising a groove, the tongue comprising a front end and sides which diverge from the front end, the groove comprising a groove base and sides which diverge from the groove base and converge towards an opening of the groove, wherein an angle of convergence of the sides of the groove is greater than an angle of divergence of the sides of the groove, the opening having a width that is greater than the front end of the tongue, the sides of the tongue having the same angle as the sides of the groove, the tongue further comprising at least one undercut arranged in a back area of the tongue which receives a projecting portion of the groove, wherein the method comprises pre-applying, at an off-site location, one of an adhesive and a substance which activates an adhesive to at least one of at least one of the sides of the groove and at least one of the sides of the tongue and connecting, at a site different from the off-site location, the first and second structural components together by causing the tongue to be inserted into the groove.

The first structural component may comprise a groove that is identical to the groove of the second structural component and the second structural component may comprise a tongue that is identical to the tongue of the first structural component.

The first structural component may comprise a groove that has the same shape as the groove of the second structural component and the second structural component may comprise a tongue that has the same shape as the tongue of the first structural component.

The connecting may lock together at least one side of the groove and at least one side of the tongue. The at least one undercut may extend over an entire length of the tongue and the projecting portion of the groove may extend over an entire length of the groove. The at least one undercut may comprise one of an indentation and a recess. The groove may be one of formed directly in and worked out of the second structural component. The tongue may be one of integrally formed and formed as a one-piece member with the first structural component.

After the connecting, the tongue may be held in the groove via a squeezing action exerted by the sides of the groove.

The method may further comprise, during the connecting, causing parts of the second structural component arranged on opposite sides of the groove to bend elastically upon insertion of the tongue into the groove. The parts of the second structural component may be arranged on opposite sides of the groove comprise legs having equal lengths.

The invention also provides for a method of connecting first and second structural components having a relatively low thickness, the first structural component comprising a tongue, the second structural component comprising a groove, the tongue comprising a front end and sides which diverge from the front end, the groove comprising a groove base and sides which diverge from the groove base and converge towards an opening of the groove, wherein an angle of convergence of the sides of the groove is greater than an angle of divergence of the sides of the groove, the opening having a width that is greater than the front end of the tongue, the sides of the tongue having the same angle as the sides of the groove, the tongue further comprising at least one undercut arranged in a back area of the tongue which receives a projecting portion of the groove, wherein the method comprises pre-applying, at an off-site location, a coating to at least one of at least the sides of the groove and at least the sides of the tongue and connecting, at a site different from the off-site location, the first and second structural components together by causing the tongue to be inserted into the groove.

The coating may comprise a latent adhesive material that becomes active after appropriate activation. The coating may comprise a surface impregnation. The coating may comprise an activator which induces adhesion.

The method may further comprise, prior to the connecting, applying a substance to the coating at the site. The coating may comprise one component of a two-component polymerization glue and the substance may comprise another component of the two-component polymerization glue. The one component may be a hardener varnish. The hardener varnish may have an organic peroxide as its base and the other component is a resin having a methyl acrylate base. The hardener varnish may have an aliphatic or cycloaliphatic polyamine as its base and the other component is based on at least one of an epoxide and bisphenol A and bisphenol F resin.

The invention also provides for a method of connecting first and second structural components having a relatively low thickness, the first structural component comprising a tongue, the second structural component comprising a groove, the tongue comprising a front end and sides which diverge from the front end, the groove comprising a groove base and sides which diverge from the groove base and converge towards an opening of the groove, wherein an angle of convergence of the sides of the groove is greater than an angle of divergence of the sides of the groove, the opening having a width that is greater than the front end of the tongue, the sides of the tongue having the same angle as the sides of the groove, the tongue further comprising at least one undercut arranged in a back area of the tongue which receives a projecting portion of the groove, wherein the method comprises pre-applying, at an off-site location, a first substance to at least one of the sides of the groove, pre-applying, at the off-site location, a second substance to at least one of the sides of the tongue, and connecting, at a site different from the off-site location, the first and second structural components together by causing the tongue to be inserted into the groove.

The first substance may comprise an adhesive or a glue. The second substance may comprise a film, a covering or a surface impregnation. The first substance may be stabilized by removal of a solvent or a dispersion agent and may reactivate upon contact with the solvent. The first substance may moisten the tongue. The second substance may comprise a solvent or a dispersing agent which activates the first substance. The first substance may comprise a dispersion glue that is stabilized by removal of water or a dispersion agent and may reactivate upon contact with a solvent. The first substance may comprise a fast-binding and mounting glue on a polyvinyl acetate base. The first substance may comprise a first component of a two-component glue. The second substance may comprise a second component of the two component glue. The second substance may comprise a first component of a two-component glue. The first substance may comprise a second component of the two component glue. The first substance may be a micro-encapsulated adhesive and the second substance may comprise a micro-encapsulated adhesive that is immediately active. The first substance may be a two-component adhesive with a mixture comprising a micro-encapsulated resin component and a micro-encapsulated hardener component. The first substance may be one of a coating and a strand of micro-encapsulated resin component of a two-component adhesive and the second substance may be one of a coating, a film, and a strand of a micro-encapsulated hardener component of the two-component adhesive. The second substance may be one of a coating and a strand of micro-encapsulated resin component of a two-component adhesive and the first substance may be one of a coating, a film, and a strand of a micro-encapsulated hardener component of the two-component adhesive. The first substance may comprise one of a coating and a film of micro-capsules that are dispersed in a matrix of a hardener component. The first substance may contain a resin component of the second substance. At least one of the first substance and the second substance may comprise a lastingly sticky and permanently active adhesive glue. The lastingly sticky and permanently active adhesive glue may exhibit viscosity values between 15,000 and 1500 centi-poise at temperatures between 140° C. and 170° C. and is applied at temperatures in the indicated range. The lastingly sticky and permanently active adhesive glue may be a molten adhesive glue.

At least one of the first substance and the second substance may comprise an integral adhesive strand having a core strand of a lastingly sticky and permanently active adhesive glue and a polymer cladding strand that surrounds the core strand on all sides, prevents diffusion of water or any adhesive solution or dispersion agent, and is destroyed by action of pressure and shearing forces exerted during the connecting. The core strand may be formed with an active adhesive or glue with setting properties that are prepared with at least one of water and a dispersion agent or solvent on at least one of a synthetic polymer base, a polyvinyl acetate base, and on a biopolymer base, on at least one of a starch and protein base. The cladding strand may be formed with a flexible polymer material that is adhesive relative to a material of the first and second structural components, at least upon application of the integral adhesive strand, and that will set rapidly, and with butyl rubber or with a two-component or moisture-linking polyurethane rubber mass.

At least one of the first substance and the second substance may comprise an integral adhesive strand having a flattened dome cross-sectional shape. The first substance may comprise an adhesive coating that is stabilized by removal of water but can be activated or re-activated upon contact with water or water moisture and exhibits a basically uniform layer thickness in the range of between 0.1 mm and 0.4 mm with thickness tolerances in the range of 0.05 mm. At least one of the sides of the tongue may comprise two surfaces oriented at an angle between 110° to 130°. One of the two surfaces may be five to seven times as long as another of the two surfaces. The groove may be arranged between two legs which flex elastically and outwards relative to the each other. The first substance may comprise one component of a two-component polymerization glue, the one component being an unhardened or not fully hardened resin component of the two-component polymerization glue, and wherein the second substance may comprise a hardener component.

The first substance and the second substance may comprise an amount that is insufficient to cause any excess to well out onto a decorative surface of the first and second structural components during the connecting. The first substance and the second substance may comprise an amount that is insufficient to cause any excess to well out onto an upper surface of the first and second structural components during the connecting.

BRIEF DESCRIPTION OF THE DRAWINGS

FIG. 1A depicts a design in which glue is applied within the groove before joining; FIG. 1B depicts a design with the glue applied to the tongue sides, and FIG. 1C shows the two components joined together, there being no difference in this position between the formation of FIGS. 1A and 1B.

FIG. 5 is a perspective view of a component provided with a groove, with a pre-applied glue bead.

DETAILED DESCRIPTION OF THE INVENTION

Figure 3:
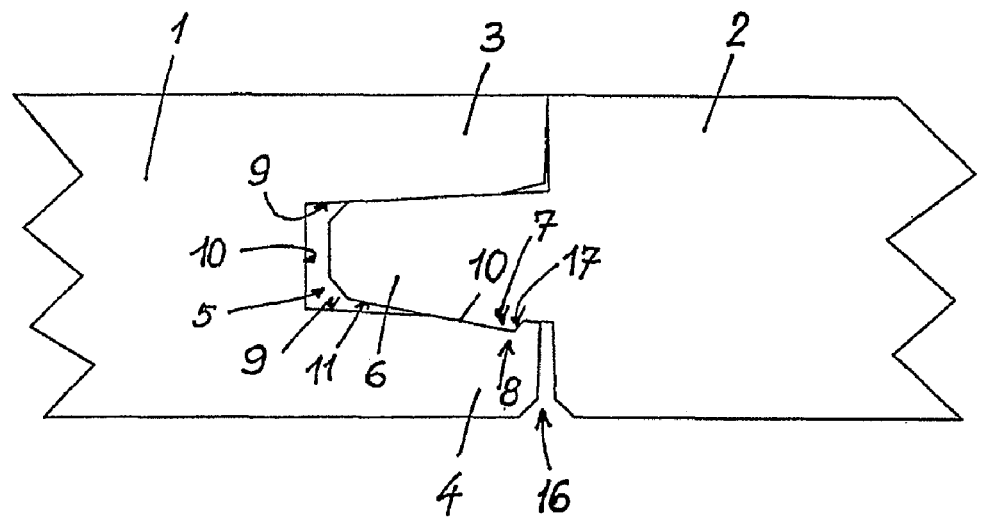
FIG. 3 also shows an embodiment in which the cross-section of the tongue and groove has been modified, in joined position.
Figure 4:
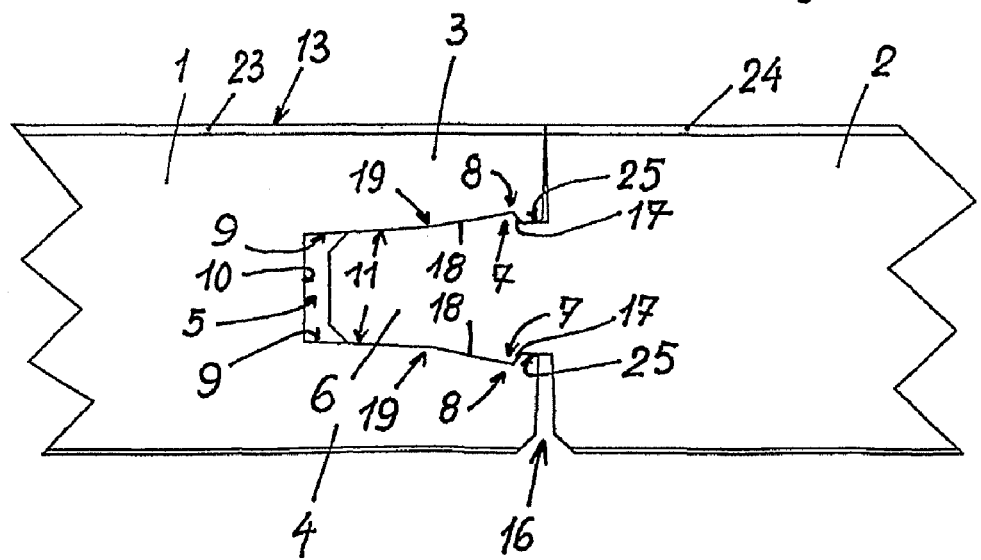
FIG. 4 shows on enlarged scale the embodiment according to FIG. 2.

FIGS. 3 and 4 show two components 1, 2 joined together, with a groove 5 formed in one component 1, into which a tongue 6 extending from the other component 2 can be inserted. In the area of their working surface the fronts of the components 1, 2 rest solidly against each other and form a gap 16 on the side facing the base. This gap shown in the figure is not necessary, but is only provided when needed. The components, which will ideally consist of wood, a wood-product, or plastic, can be provided with coatings 23, 24 is order to have the appropriate surface qualities or appearance.

Mutually fitting locking elements 7, 8 are provided on the tongue 6, or the wedge-shaped areas 11 of the tongue, and in the groove 5, or the lateral areas 9 of the groove. These locking elements 7, 8 can be projections and/or recesses which interact or interlock with each other. The cross-sections of the recesses and corresponding projections 7, 8 correspond such that they rest against each other.

When the components 1, 2 are combined, the locking elements 7, 8 are engaged with each other. The locking elements 7, 8 are formed over the entire length of the longitudinal and/or narrow sides of the components 1, 2.

As shown in FIG. 3, on at least one tongue wedge area 11 a projection 7 is formed which is received by the recess 8 in the adjacent groove face area 9. When the tongue 6 is inserted into the groove 5 the two groove faces 3, 4 are moved apart elastically.

The cross-section of the projection 7 and the recess 8 is triangular, and the triangular side 17 closer to the groove opening is shorter and more sharply inclined than the triangular side 18 closer to the groove base 10. When the tongue 6 is inserted into the groove 5, the longer side 18 of the projection 7 slides on the inner side—or a beveled section formed in this area—of the front edge of the groove face 3, until the projection 7 has overcome this inner edge 25 and is received by the recess 8.

To make the connection, it is advantageous if the triangle side 18 close to the groove base is four to eight times, ideally five to seven times, as long as the triangle side 17 away from the groove base and if the angle between the two triangular sides 17, 18 is between 100° and 140°, specifically 110° and 130°.

To facilitate insertion, it is advantageous if the terminal edges of the tongue 6 lying on the inside are provided with a beveled section and/or the inner terminal area of the groove leg 4 without a locking element is provided with a beveled area.

To form a defined reciprocal position for the components 1, 2, it is expedient if the angle of the working area or the surface of the longer triangle side 18 belonging to the projection 7 on the tongue 6 corresponds to the angle, or incline, of the front area of the tongue wedge area 11, the front portion of which runs at a distance from the groove face area 9. Here the tongue area without locking elements (see FIG. 3) can rest for most of its length on the groove face 9, and both areas, as viewed from the groove base 10, approach the surface, or working area, of the two components 1, 2. In this manner the two areas 9, 11 serve as sliding or guide areas and support the groove sides 3, 4 in spreading apart when the projection 7 slides over the outer edge or sliding surface of the side 3.

Figure 1:
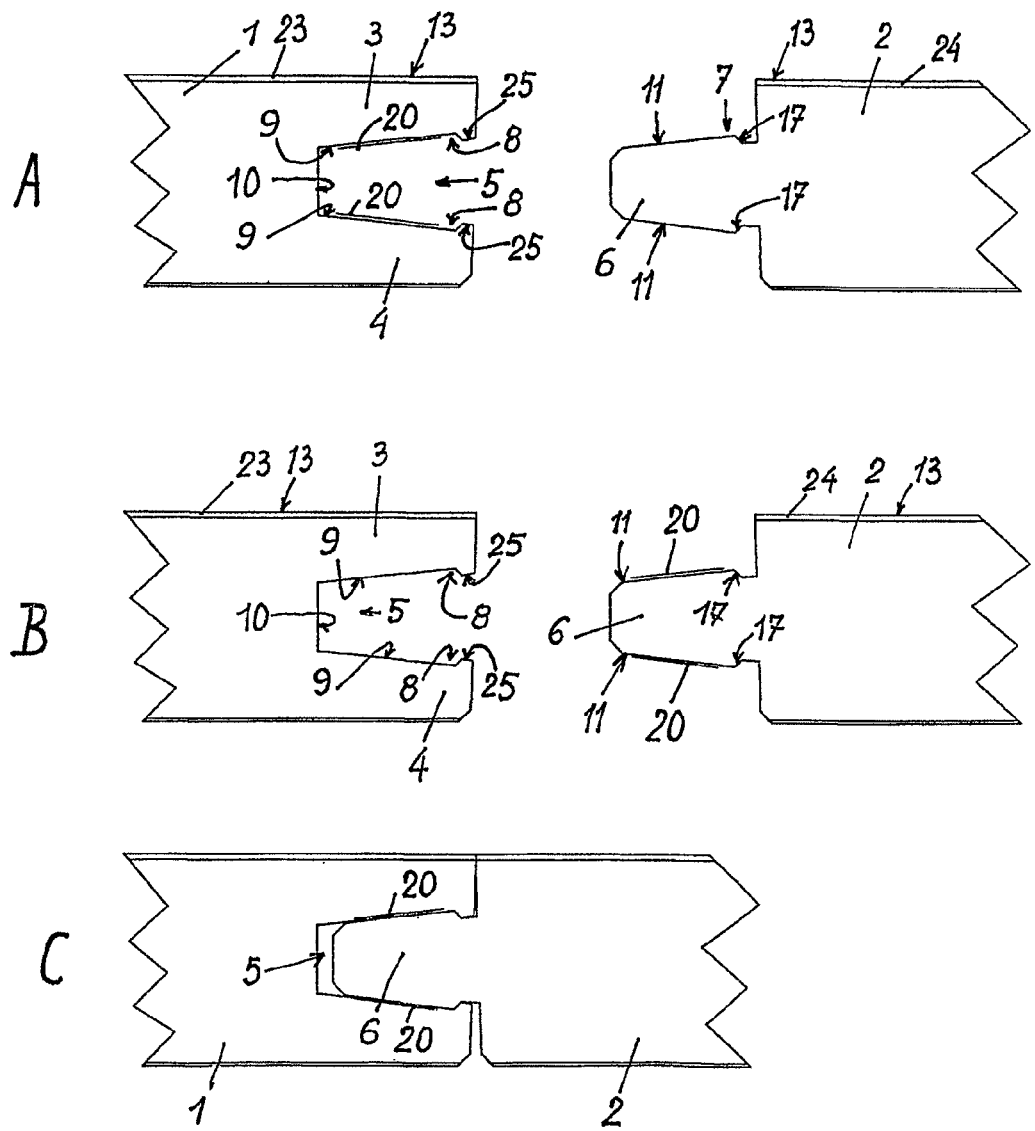
FIG. 1 schematically depicts an initial embodiment of the configuration according to the invention. Specifically.
Figure 2:
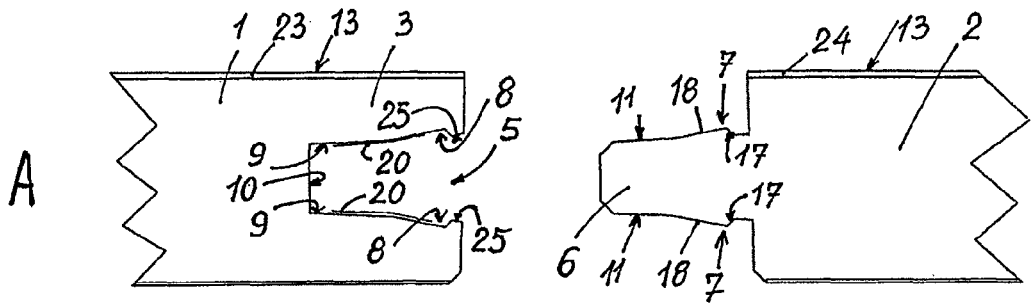
FIG. 2 is a depiction analogous to that of FIG. 1, showing an embodiment that has been modified with respect to the cross-section of the tongue and groove.
Figure 2:
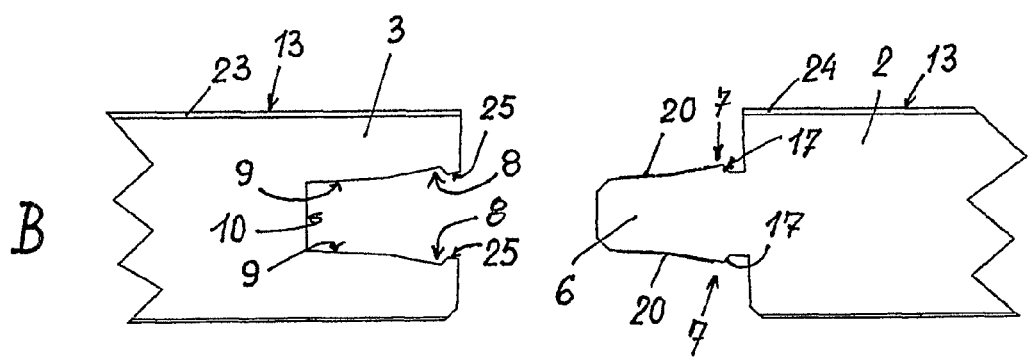
Figure 2:
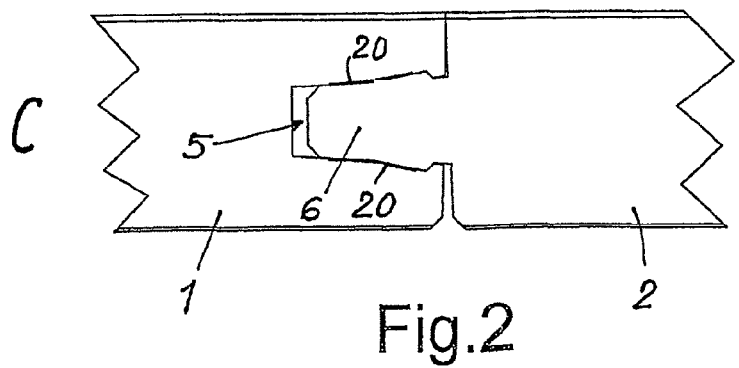

In an advantageous embodiment according to FIGS. 1, 2, and 4 it is provided that symmetrically positioned projections 7 or recesses 8 are formed on the two opposite tongue areas 11, and recesses and projections adjusted to these projections 7 and recesses 8 are formed on these two adjacent groove areas 9 or, as the case may be, that the groove 5 and the tongue 6 are swallow-tailed in shape and are fitted to each other. This embodiment permits the doubled locking of the two components 1, 2.

In this embodiment the longer side 18 of the triangle, or the area of the projection 7 formed by it, passes into the front area of the tongue wedge area 11 while forming a bend 19; the longer side 18 of the triangle and this front portion of the tongue wedge area 11 lie immediately adjacent to each other; this permits a very precise connection of the components 1, 2 and simultaneously assures that the components 1, 2 abut each other under pressure, so that with the interaction of the triangular areas 17 with their matching areas a gap is not formed in the working area 13 and the components 1, 2 do not separate in the course of use.

In FIGS. 1 and 2 the layer of glue is indicated by numeral 20; as explained below in detail, the layer can be provided either on the wall 9 of the groove side (FIG. 1A or FIG. 2A) or on the tongue wedge areas 11 (FIG. 1B or FIG. 2B); a glue activator, or the like, can then be applied to the matching areas. When two-component glues are used, the first component can be provided on one area and the second component can be provided on the matching area.

In FIG. 5 the layer of glue is schematically depicted in the form of a glue bead.

Panels already provided with glue—whether the glue is active in advance or becomes active when the panels are joined on site—have the striking benefit that the number of maneuvers and manual stages involved in laying out the panels on site is considerably reduced and in that the step regarded as time-consuming and unpleasant by both the professional and the amateur working at home is eliminated, namely that of applying as uniformly as possible a gluey substance in sufficient, but not excessive quantity over the entire side length of the groove and/or tongues of the panel on the installation site. This eliminates the problem of the glue setting prematurely during delays in the laying process, such as makes impossible a practically seamless joining. Also eliminated is the unpleasant welling out of excess glue, which must be removed immediately after having left the joints, so as to avoid the formation of spots on the decorative layer.

The glue, in whatever basic form it may be contained by the grooves and/or on the tongues of the panels, is mechanically applied in advance, and thus in dosed form, in or on the panel, board, or the like, that is delivered to the site. A welling out of excess glue onto the decorative surface while the panels are being joined together is thus eliminated. Furthermore, there is no danger of a premature binding of the glue, as described above. As for the different glues that come into consideration, the following can be stated:

First to be mentioned are the glues that are most frequently used. Glues are adhesives that consist of water-soluble animal (glutine, casein), vegetable (starch, dextrin, cellulose ether), or synthetic (e.g., polyacrylic acid derivatives, polyvinyl alcohol, polyvinyl pyrrolidon) polymers and water as a solvent. They belong to the class of single-component, cold-setting glues, for which the solvent (water) is absorbed during the process of conglutineation, escapes, or the like. The spread cements congeal in jelly-like fashion upon cooling and usually dry into a transparent mass. Upon contact with water this dissolves into a gel with high adhesive power.

Specific glues that can be used in the context of the invention are mentioned in the following. Suitable are both fully synthetic glues, such as artificial resin glues, e.g., polyvinyl acetate wood glue, as well as those of vegetable origin, such as dextrin, starch, sago or tapioca glue, and of animal original, such as skin, leather, bone, and casein glues. In addition to the already mentioned physically setting cements, chemically setting glues can be employed, such as those based on urea, melamine, phenol, or cresol resins.

Also under consideration are, e.g., so-called all-purpose glues. These are usually solutions or dispersion of polymers, e.g., cellulose nitrate, polyvinyl acetate, polyacrylates, among others, with (alcoholic) esters and/or cretones or water as solvent, or water as a dispersion medium. All-purpose glues set by releasing the solvent/dispersion medium into the atmosphere (evaporation) or into the (porous) substrates being glued. For the panels according to the invention they are applied in "wet" or gel-like condition to the grooves, and the given solvent or dispersion medium is then withdrawn, thereby achieving a conversion into a durable form that is stable during storage.

Other glues suitable for use are contact glues which are applied as a solution or dispersion to the substrates being glued and which develop their adhesive effect after evaporation of the solvent, i.e., when the glue films are evidently dry, and under the effect of pressure exerted when the panels are joined. The base polymers of the contact glues are primarily polyacrylates, polychloroprenes, nitrile or styrene butadiene rubber, and polyurethanes. They may additionally contain tackifying resins, such as colophonium, hydrocarbon resins, or phenol resins.

Under certain circumstances so-called anaerobic glues can be used, which, e.g., harden in the absence of air, but whose flowing and adhesive properties remain unrestricted in the presence of nitrogen. They are based, e.g., monomeric dimethacrylic acid esters of diolene, e.g., polyethylene glycols.

In an initial advantageous embodiment of the invention, a covering that employs the form-fitting elements, i.e., the grooves and/or tongues of the panels, are provided with a latently adhesive coating which will be converted into active condition during the laying process, either by the simple conversion of an already prepared glue from a dry or durable form through moistening with a solvent, particularly water, or by activation of a latent adhesive by an activator that initiates the setting and hardening of the adhesive.

A preferred secondary form of the embodiment just described is a (floor) cover with panels whose form-fitting elements are provided with a bonding agent that is activated as described above; according to this claim, a glue that is originally prepared with water—either as a gel-like adhesive dissolved or dispersed in water, or a comparable glue—is spread in fresh, "wet" condition as a coating and is then allowed to "dry". With the application of water, the "dry" bonding agent is activated when the panels are assembled and reconverted into active condition; the water can be applied directly to the dried cement layer, or there can be indirect, intensive contact with water that is applied to a (matching) form-fitting element of an adjacent panel being fitted. The activator, which will preferably be aqueous, can be spread, e.g., by simple dosed spraying or by application with a rubber sponge, or the like, to the surface(s) of the panels' form-fitting elements.

A second, preferred means of activating the latently adhesive coatings on the grooves and/or tongues of the panels used for coverings, particularly floor coverings, by means of a polymer-chemical process consists in applying individual components of a two-compound cement system to the form-fitting elements in a form such that they do not release their adhesive, setting, and hardening properties until the panels are fitted, during the process of laying the floor covering according to the invention. Only during the joining process itself are the indicated components activated, to generate the actual bonding agent and finally to set and harden while forming a mechanically stable adhesive connection.

Thus, an advantageous variation of the invention rests in the fact that the two individual components that together form the active binding agent are applied in their inert form to the form-fitting elements and/or matching form-fitting elements, i.e., to the grooves and/or tongues of the panels.

Another variant can consist in the fact that only one of the two components is applied at the time of the panel's manufacture and the other component is applied only just before laying and joining the panels to form the flat covering on site. Particularly preferred is a cement precursor coating consisting of a so-called hardener varnish applied to at least one of the form-fitting elements, thus a film applied like a coat, consisting of—or containing—the hardener components of a two-component cement, while the resin components can only be applied to the hardener varnish, e.g., before the floor is laid, or to a form-fitting element that comes into contact with the hardener varnish during joining.

Concerning the spectrum of mentioned adhesives, the following must additionally be stated: acrylate adhesives are adhesives on a base of acryl monomers, particularly acrylic and methacrylic acids. The acrylate adhesives in the narrow sense consist of (meth)-acryl monomers, a polymer which functions as a thickener and elasticizing agent, and an initiator to trigger polymerization, preferably a redox initiator; they are employed as two-component adhesives in combination with an activator. Instead of methyl methacrylate, less volatile and odor-intensive (meth)acrylates are preferred today, e.g., oligomeric polyurethane dimethacrylates, and this is particularly favorable when these resin components are applied before laying the floor, for reasons of work safety.

Adhesive components of the acrylate adhesives can also be polymers with an ethyl and/or butyl acrylate base, whose properties, e.g., hardness and elasticity, can be adjusted in controlled fashion during polymerization when they are joined by suitable co-monomers, e.g. methacrylates, and which contain additional functional groups, like carboxy and hydroxy groups, to improve the adhesive qualities; they can be widely used, e.g., as solutions or dispersion, as well as bonding adhesives. Adhesive bonds created with acrylate glues are distinguished by their high strength.

According to a variation that is in itself expensive and therefore comes into consideration for higher quality coverings, the coating or cover for the form-fitting elements of the panels of the new floor covering is formed by an adhesive that is encapsulated in micro-spheres, or the like, but that is permanently and immediately active. When the panels are joined together, i.e., when the tongues are inserted into the grooves, resulting shearing and pressure forces destroy or tear the claddings of the microcapsules, and the active glue contained in the capsules is released.

In another advantageous type of micro-encapsulation of the adhesive coating applied to the groove and/or tongue of the panels, one of the form-fitting elements is provided with a coating in which one of the two components of the indicated two-component glue system is contained in micro-encapsulated form. The (matching) form-fitting element on the panel being connected is coated with the other component of the glue system, which may also be micro-encapsulated.

When the panels are joined, the claddings of micro-capsules tear open and the resin and hardener components combine, so that the glue is brought into complete form, the adhesive process is introduced, and the setting and hardening proceed.

Also provided is a coating with a two-component glue system based on micro-capsules, in which only one, e.g., the more sensitive, component is contained in micro-capsules, while the other and, ideally, less sensitive component of the system forms a matrix for the micro-capsules of the first component.

Another type of adhesion available for the panels of the new floor covering has proven to be advantageous as based on favorable test results and experiences; here the grooves and/or tongues of the panels are covered or coated with an adhesive glue, particularly with a molten adhesive glue. Adhesive glues are visco-elastic glues which remain permanently sticky and adhesive at room temperature and, given a low substrate specificity, adhere to almost all substrates when subjected to light pressure. The base polymers for modern adhesive glues are natural and synthetic rubbers, polyacrylates, polyesters, polychloroproprenes, polyisobutenes, polyvinyl ethers, and polyurethanes, which are employed in combination with additives, such as other resins, softeners, and/or antioxidants. As a rule, adhesive glues are applied as solutions or dispersions in, or on, the form-fitting elements.

Molten adhesive glues, on the other hand, are applied in a molten gel condition, where the molten glue can be applied in the form of a coating, layer, or strand, or by means of a hot-spray application. Adhesive glues differ from so-called constructive glues, that is, from, e.g., chemically reactive glues, in that they are lastingly sticky and permanently adhesive. Merely by being pressed against the surface of the piece being joined these glues induce a moistening of the latter's surfaces, thereby providing sufficient adhesive forces. The decisive parameters in gluing the tongue-groove panels are the pressure force and the quantity of applied glue. Though not a problem in the context of panel production, special attention must be paid to the quantity of applied glue, since there will be insufficient moistening when too little glue is present. If the quantity of glue is excessive, a gap that is too large remains after the panels have been joined, since the glue cannot be displaced, and this is a disadvantage, though one that no longer occurs when the glue is applied at the manufacturing site. Adhesive glues that are applied from the melt—i.e., the so-called molten adhesive glues—have an advantage in that they can be applied with a sufficient layer thickness, allowing the problem described above concerning the excessive thinness of glue layers to be circumvented; they have the further advantage of permitting a very precise dosing.

Concerning the adhesive and molten adhesive glues it remains only to remark that the properties of strength and adhesion they develop by being pressed are somewhat lower than is the case with, e.g., chemically reactive glues but are thoroughly adequate for floor coverings.

A great advantage possessed by the molten adhesive glues in gluing together the tongue and groove of the panels rests in the fact that they retain their "tack", or adhesive property, even after longer storage periods, i.e., they do not harden. Further advantages are their environmental friendliness, since they are anhydrous and free of any solvent; the limited expense in terms of space and investment required for them at the processing plants, and their relatively low energy requirements.

Finally, two commercial molten adhesive glues must be mentioned that are particularly advantageous for floor coverings with a high load and that guarantee secure panel connections. The "Dorus PS 534/5" molten adhesive glue is a molten adhesive glue of low viscosity with a relatively high melting point and with very good shearing-stength properties for this kind of glue. This glue can be specially stabilized for processing with molten glue handguns and small application devices, in order to prevent the occurrence of cracking in the case of low consumption and a high processing temperature. The recommended processing and application temperature is between 140 and 170.degree. C. For the concrete gluing of the panels onto a base of wood-product laminate an application temperature in the area of about 150.degree. C. has proven to be effective. The storage capability of the glue coating thus produced for the groove and/or tongue is at least one year, for normal and dry storage. The viscosity of the other molten adhesive glue "Dorus PS 576/6" lies below the viscosity of the described Dorus PS 534/5 glue. It possesses a high free adhesiveness. The softening point is at a level comparable to that of the Dorus PS 534/5. The processing temperature and storage capacity are also basically analogous to the Dorus PS 534/5. The storage capability of the latent adhesive layer produced with the Dorus PS 576/6 is also at least one year. As briefly mentioned above, the problem confronted by panels that are provided at their point of manufacture with adhesive layers, for coverings of the most diverse kind, lies in depositing or applying the adhesive in a form such that, after the adhesive is prepared, it does not change over longer periods of time or become modified by extreme influences. However, the glue should immediately enter its active state when the panels are joined together to form the covering, specifically the floor coverings.

Larger test series have shown that active bonding agents, glues, or the like for covering panels do not have to be present in micro-encapsulated form, such as described in greater detail above, but that—in practically "macro-encapsulated" form—they can be present in the form of an integral, somewhat tube-like strand applied to, or deposited on, the form-fitting elements of the panels.

In a particularly preferred embodiment resting on this principle of providing the glue, the deposited glue in active condition is enclosed in an endless core strand that circles and seals it; upon insertion or application, the cladding immediately sticks to the given groove or tongue of the panels, or to one of their surfaces or sides.

The indicated adhesive cladding tube keeps external influences at a distance from the adhesive material of the core strand that it encloses and thus prevents any modification of the same. At the same time, the cladding tube is mechanically sensitive, so that it will tear when the panels are joined, thereby releasing the active glue that it has kept fresh, which can then set and harden. The fragments of the torn cladding are so thin that they do not obstruct the precise, "seamless" joining of the panels mentioned above.

With the aid of the just-described adhesive cladding/core-endless strand system and its exact dimensioning, the adhesive can be adjusted to the geometric relationships and tolerances of the given tongue and groove connection and its quantity can be precisely dosed according to the unit of length of the particular form-fitting element. A high degree of uniformity in the adhesive layer is thereby assured, and the unpleasant welling out of excess glue, as described above, is safely averted, along with its consequences.

Suitable polymers and adhesives for the cladding of the novel adhesive strands will set rapidly after successful extrusion, thereby preventing the escape of core adhesive during the insertion or application of the integral adhesive strand. Polymers suitable to this purpose should be compatible with the core adhesive; thus, given a wood cement as core, they should withdraw only a little or no water, and they should permit practically no diffusion of water from the core adhesive in the outward direction.

It proved to be the case that the "butyl adhesives" that are particularly suitable for high-load floor coverings are able to protect the core adhesive from "drying out" over longer periods of time, e.g., over several weeks or months. However, adhesives with a polyurethane-rubber base also come into consideration for the cladding strand.

FIG. 5 depicts a preferred form of the cross-section of the cladding/core adhesive strand in the groove and/or on the tongue of the panels of the new pre-glued, ready-to-lay floor coverings. A uniformly thick coating film with the adhesive, as provided in other embodiments of the invention discussed above, is not given here.

The polymers and adhesives for the described strand of co-extrudate are naturally subject to the demand that the skin that forms its cladding is sealed. Disruption of the protective cladding by blisters, impurities, or damage would create the danger of local hardening of the adhesive belonging to the core strand. It would then no longer be possible to correctly join the entire tongue-groove structure, i.e., almost "seamlessly".

As for regulating the skin thickness of the cladding strand, the cladding strand material itself does not have to be an obstacle to the desired "seamless" joining and pressing together of the panels. Upon joining, it must be capable of free the path for the core adhesive to the wood or the wood-product material and it must not place a load on larger areas between wood and cement. Under certain circumstances, changes in the geometry within the groove might have a supportive effect.

With respect to the viscosity of the materials constituting the cladding and core strand: it must be possible to realize with as little technical expense as possible the necessarily simultaneous, uniform extrusion of cladding and core polymer in the desired, constant ratio of quantities one to the other. Viscosities that are too high result in relatively high feed pressures; viscosities that are too low would negatively effect both the transport stability and the formation of the cladding skin and the core strand or, as the case may be, the formation of the overall strand bead, during co-extrusion. A genuine adjustment of the two substrates' viscosities to each other during the application process has not proven to be necessary.

As regards the feed pressure, it must be noted that commercial butyl rubbers or moisture-linking polyurethanes usually exhibit high viscosities, so that feed pressures of up to 20 bar for the co-extrusion of the adhesives have proven favorable. Concerning the temperature differences between the core and cladding strand polymer material when the integral adhesive strand comes out, it is advantageous in the dosing system if each of the two components for cladding and core can be heated up to the co-extrusion nozzle. It is also advantageous if the two adhesive polymers can be extruded at approximately equal temperatures. If the temperature differences between the core and the cladding strand were too great when the integral strand is inserted or applied, special precautions would be necessary for thermal insulation and separated heating systems.

Regarding the dimensions or dimensioning of the adhesive strand, it can be stated that in the case of laminate panels with groove widths of about 3 mm the diameter of the adhesive bead or strand must lie within this dimension. The production of core-cladding strands with diameters of at least 1.5 mm and strand cladding thicknesses of at last 0.15 mm has proven to be cost-effective and the technically manageable.

Particularly simple are tongue and groove snapping systems of a third kind, in which only an undercut groove is provided, one that can be pushed apart during joining by penetration of a tongue that has a widened rim and belongs to the adjacent panel; here the groove closes again when the widened part of the tongue snaps into the undercut zone of the groove, providing a mechanical latch-like or hook-like connection. In voluminous tests it has proven to be the case that with these self-upholding, snapping system panels it is advantageous to enhance the coherence of the panels with a layer of glue. Given the circumstances explained at the outset, it will be understood that in the case of floors to be laid with panels outfitted with lateral snapping elements a readiness to perform an application of glue on site cannot be imputed to the person laying the floor. Thus, the present invention, with the glue or adhesive layer already applied in the course of the panel's manufacture, will be particularly of value for these select and correspondingly expensive panel systems.

Of the described adhesive systems for panels with a pre-applied layer of glue it is natural that glues are preferred which do not require the on-site application of an activator for an already applied adhesive or the application of the second component of a two-component glue onto a layer of the first component already applied in the factory.

As for the application of the adhesive in, or on, form-fitting elements that snap together, all methods of application come into consideration, such as coating, rolling, thin-layer pouring, or the like; here care must be taken to assure that the applied adhesive film will bear the shearing load that arises when the snapping elements are brought together, and also that the film's adhesion to the panel substrate is not lost; on the other hand, there must be a uniform layer thickness in the range of only 0.3 downwards, preferably 0.2 mm downwards, since otherwise the glue exhibits to much actual volume in certain places, and thus takes too much space, and the form-fit and particularly the proper interlocking of tongue and groove will be impeded.

Not only for the snapping tongue and groove panels just explained, but also for panels with every other type of form-fitting elements it is therefore preferable to apply the adhesive layer by spraying a molten adhesive into or onto the groove and/or tongue. Thicknesses in the area of a maximal 0.25 mm for the sprayed layers have proven themselves for a unilateral layer, that is either in the groove only or on the tongue only. For a bilateral layer on the tongue and groove surfaces the film thickness must be reduced accordingly, since otherwise a form-fit cannot be achieved without the use of force.

For coverings with form-fitting panels that snap together an increase in the cohesion of the panels in a range of up to two-fold was achieved by the use an adhesive layer. The typical value was +70%.

As mentioned at the outset, another fundamental object of the present invention—for the formation of the already described coverings, casings, etc., and particularly floor coverings—is comprised by the panels, plates, boards, battens, listels, or the like that are pre-glued and ready to lay in a manner adapted to their form-fitting design. These are outfitted with the adhesives in precisely the way already described in detail for the coverings made of them and in the various preferred variants.

What is claimed:

1. A method of connecting first and second structural components having a relatively low thickness, the first structural component comprising a tongue, the second structural component comprising a groove, the tongue comprising a front end and sides which diverge from the front end, the groove comprising a groove base and sides which diverge from the groove base and converge towards an opening of the groove, wherein an angle of convergence of the sides of the groove is greater than an angle of divergence of the sides of the groove, the opening having a width that is greater than the front end of the tongue, the sides of the tongue having the same angle as the sides of the groove, the tongue further comprising at least one undercut arranged in a back area of the tongue which receives a projecting portion of the groove, the method comprising:

pre-applying, at an off-site location, an adhesive to: (i) at least one of the sides of the groove or (ii) at least one of the sides of the tongue;

pre-applying, at an off-site location, a substance different from the adhesive and which activates the adhesive to: (i) at least one of the sides of the tongue or (ii) at least one of the sides of the groove, respectively;

connecting, at a site different from the off-site location, the first and second structural components together by causing the tongue to be inserted into the groove.

2. The method of claim 1, wherein, after the connecting, the tongue is held in the groove via a squeezing action exerted by the sides of the groove.

3. The method of claim 1, further comprising, during the connecting, causing parts of the second structural component arranged on opposite sides of the groove to bend elastically upon insertion of the tongue into the groove.

4. The method of claim 3, wherein the parts of the second structural component arranged on opposite sides of the groove comprise legs having equal lengths.

5. The method of claim 1, wherein the substance comprises a hardener component.

6. A method of connecting first and second structural components having a relatively low thickness, the first structural component comprising a tongue, the second structural component comprising a groove, the tongue comprising a front end and sides which diverge from the front end, the groove comprising a groove base and sides which diverge from the groove base and converge towards an opening of the groove, wherein an angle of convergence of the sides of the groove is greater than an angle of divergence of the sides of the groove, the opening having a width that is greater than the front end of the tongue, the sides of the tongue having the same angle as the sides of the groove, the tongue further comprising at least one undercut arranged in a back area of the tongue which receives a projecting portion of the groove, the method comprising:

pre-applying, at an off-site location, a first substance to at least one of the sides of the groove and to at least one of the sides of the tongue;

pre-applying, at the off-site location, a second substance to at least one of the sides of the tongue and to at least one of the sides of the groove; and connecting, at a site different from the off-site location, the first and second structural components together by causing the tongue to be inserted into the groove, wherein the second substance is a different material than the first substance, wherein the first substance and the second substance, when connected at the site holds the tongue and groove together.

7. A method of connecting first and second structural components having a relatively low thickness, the first structural component comprising a tongue, the second structural component comprising a groove, the tongue comprising a front end and sides which diverge from the front end, the groove comprising a groove base and sides which diverge from the groove base and converge towards an opening of the groove, wherein an angle of convergence of the sides of the groove is greater than an angle of divergence of the sides of the groove, the opening having a width that is greater than the front end of the tongue, the sides of the tongue having the same angle as the sides of the groove, the tongue further comprising at least one undercut arranged in a back area of the tongue which receives a projecting portion of the groove, the method comprising:

pre-applying, at an off-site location, an adhesive to at least one side of the groove and the tongue; and connecting, at a site different from the off-site location, the first and second structural components together by causing the tongue to be inserted into the groove.

8. The method of claim 7, wherein the pre-applying the coating comprises pre-applying a latent adhesive material that becomes active after appropriate activation.

9. The method of claim 7, wherein the pre-applying the coating comprises pre-applying a surface impregnation.

10. The method of claim 7, wherein the pre-applying the coating comprises pre-applying an activator which induces adhesion.

11. The method of claim 7, further comprising, prior to the connecting, applying a substance to the coating at the site.

12. The method of claim 11, wherein the coating comprises one component of a two-component polymerization glue and the substance comprises another component of the two-component polymerization glue.

13. The method of claim 12, wherein the one component is a hardener varnish.

14. The method of claim 13, wherein the hardener varnish has an organic peroxide as its base and the other component is a resin having a methyl acrylate base.

15. The method of claim 13, wherein the hardener varnish has an aliphatic or cycloaliphatic polyamine as its base and the other component is based on at least one of an epoxide and bisphenol A and bisphenol F resin.

16. The method of claim 7, wherein the pre-applying the coating comprises:

applying a first component of a two-component polymerization glue to one of the groove or the tongue; and applying a second component of the two-component polymerization glue to an other one of the groove or the tongue, to which the adhesive is not applied, wherein the first component is a different material than the second component, and the first component activates the second component upon coming into contact with the second component.

17. The method of claim 7, wherein the coating comprises a hardener varnish.

18. The method of claim 6, wherein the second substance comprises a hardener varnish.

19. The method of claim 6, wherein the first substance comprises an adhesive or a glue.

20. The method of claim 6, wherein the second substance comprises a film, a covering or a surface impregnation.

21. The method of claim 6, wherein the first substance is stabilized by removal of a solvent or a dispersion agent and can reactivate upon contact with the solvent.

22. The method of claim 6, wherein the first substance moistens the tongue.

23. The method of claim 6, wherein the second substance comprises a solvent or a dispersing agent which activates the first substance.

24. The method of claim 6, wherein the first substance comprises a dispersion glue that is stabilized by removal of water or a dispersion agent and can reactivate upon contact with a solvent.

25. The method of claim 6, wherein the first substance comprises a fast-binding and mounting glue on a polyvinyl acetate base.

26. The method of claim 6, wherein the first substance comprises a first component of a two-component glue.

27. The method of claim 26, wherein the second substance comprises a second component of the two component glue.

28. The method of claim 6, wherein the first substance is a micro-encapsulated adhesive and the second substance comprises a micro-encapsulated adhesive that is immediately active.

29. The method of claim 6, wherein the first substance is a two-component adhesive with a mixture comprising a micro-encapsulated resin component and a micro-encapsulated hardener component.

30. The method of claim 6, wherein the first substance is one of a coating and a strand of micro-encapsulated resin component of a two-component adhesive and wherein the second substance is one of a coating, a film, and a strand of a micro-encapsulated hardener component of the two-component adhesive.

31. The method of claim, wherein the first substance comprises one of a coating and a film of micro-capsules that are dispersed in a matrix of a hardener component.

32. The method of claim 6, wherein the first substance contains a resin component of the second substance.

33. The method of claim 6, wherein at least one of the first substance and the second substance comprises a lastingly sticky and permanently active adhesive glue.

34. The method of claim 33, wherein the lastingly sticky and permanently active adhesive glue exhibits viscosity values between 15,000 and 1500 centi-poise at temperatures between 140° C. and 170° C. and is applied at temperatures in an indicated range.

35. The method of claim 33, wherein the lastingly sticky and permanently active adhesive glue is molten adhesive glue.

36. The method of claim 6, wherein at least one of the first substance and the second substance comprises an integral adhesive strand having a core strand of a lastingly sticky and permanently active adhesive glue and a polymer cladding strand that surrounds the core strand on all sides, prevents diffusion of water or any adhesive solution or dispersion agent, and is destroyed by action of pressure and shearing forces exerted during the connecting.

37. The method of claim 36, wherein the core strand is formed with an active adhesive or glue with setting properties that are prepared with at least one of water and the dispersion agent or solvent on at least one of a synthetic polymer base, a polyvinyl acetate base, and on a biopolymer base, on at least one of a starch and protein base.

38. The method of claim 36, wherein the cladding strand is formed with a flexible polymer material that is adhesive relative to a material of the first and second structural components, at least upon application of the integral adhesive strand, and that will set rapidly, and with butyl rubber or with a two-component or moisture-linking polyurethane rubber mass.

39. The method of claim 6, wherein at least one of the first substance and the second substance comprises an integral adhesive strand having a flattened dome cross-sectional shape.

40. The method of claim 6, wherein the first substance comprises a adhesive coating that is stabilized by removal of water but can be activated or re-activated upon contact with water or water moisture and exhibits a basically uniform layer thickness in the range of between 0.1 mm and 0.4 mm with thickness tolerances in the range of 0.05 mm.

41. The method of claim 6, wherein the first substance comprises one component of a two-component polymerization glue, the one component being an unhardened or not fully hardened resin component of the two-component polymerization glue, and wherein the second substance comprises a hardener component.

42. The method of claim 6, wherein the first substance and the second substance comprises an amount that is insufficient to cause any excess to well out onto a decorative or upper surface of the first and second structural components during the connecting.

43. The method of claim 6, further comprising ensuring that the first substance and the second substance comprises an amount that is insufficient to cause any excess to well out onto an upper surface of the first and second structural components during the connecting.

44. The method of claim 6, wherein:
the first substance comprises an adhesive, and
the second substance activates the adhesive when brought into contact with the adhesive.

45. The method of claim 6, wherein the second substance comprises a hardener varnish.

\* \* \* \* \*